No. 670,672. Patented Mar. 26, 1901.
G. W. HOADLEY.
COMBINATION METAL AND WOOD WORKING MACHINE.
(Application filed Dec. 26, 1900.)
(No Model.) 2 Sheets—Sheet 1.
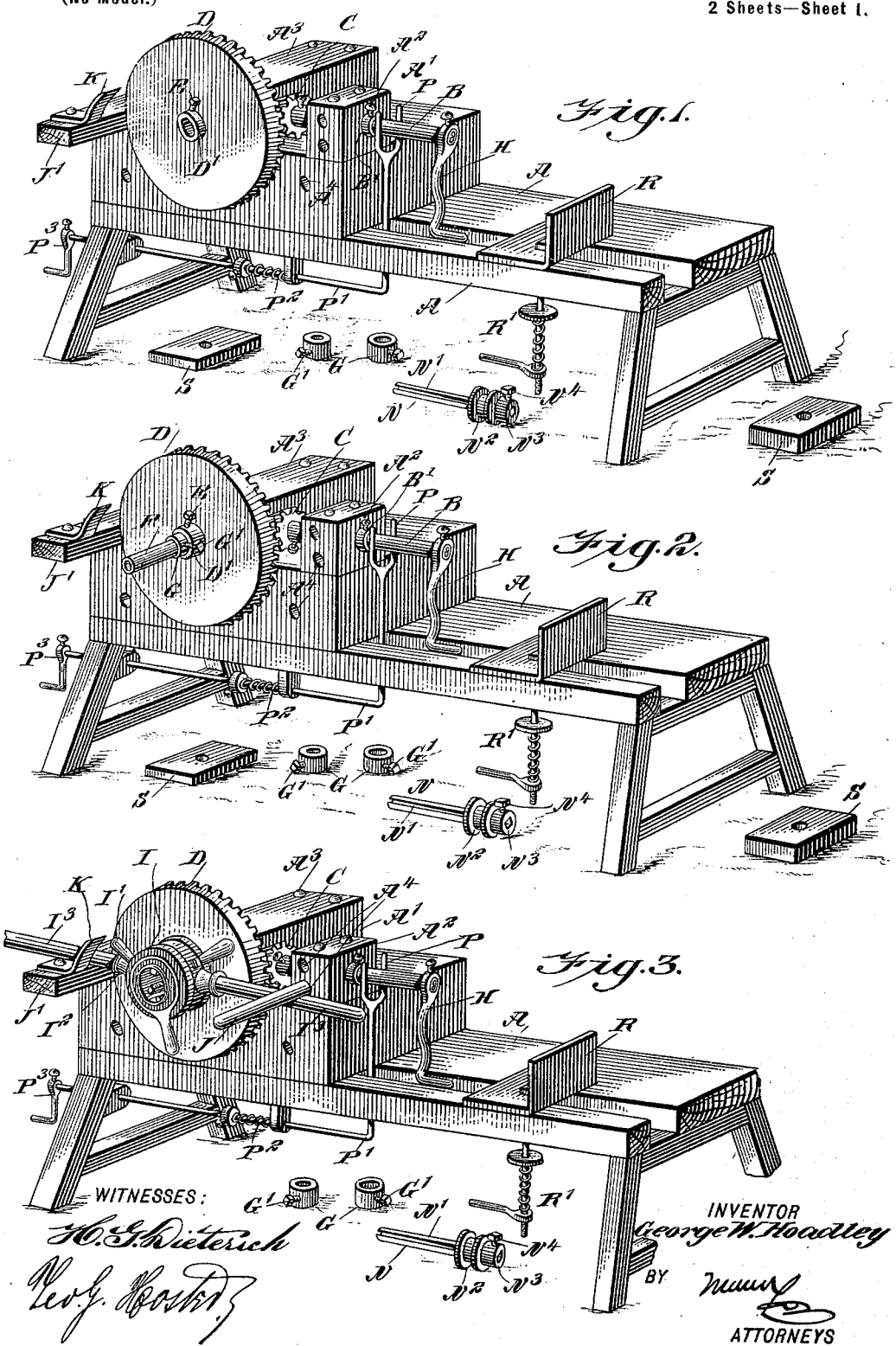
WITNESSES:
INVENTOR
George W. Hoadley
BY
ATTORNEYS No. 670,672. Patented Mar. 26, 1901.
G. W. HOADLEY.
COMBINATION METAL AND WOOD WORKING MACHINE.
(Application filed Dec. 26, 1900.)
(No Model.) 2 Sheets—Sheet 2.

WITNESSES:
H. G. Dieterich
Rev. G. Hostutz

INVENTOR
George W. Hoadley.
BY
Munn
ATTORNEYS

THE NORRIS PETERS CO., PHOTO-LITHO., WASHINGTON, D. C.

UNITED STATES PATENT OFFICE.

GEORGE WILLIAM HOADLEY, OF GARDENGROVE, IOWA.

COMBINATION METAL AND WOOD WORKING MACHINE.

SPECIFICATION forming part of Letters Patent No. 670,672, dated March 26, 1901.

Application filed December 26, 1900. Serial No. 41,063. (No model.)

*To all whom it may concern:*

Be it known that I, GEORGE WILLIAM HOADLEY, a citizen of the United States, and a resident of Gardengrove, in the county of Decatur and State of Iowa, have invented a new and Improved Combination Metal and Wood Working Machine, of which the following is a full, clear, and exact description.

The object of the invention is to provide a new and improved combination metal and wood working machine more especially designed for the use of blacksmiths, wheelwrights, and other mechanics, hardware and implement dealers, and other persons desiring a simple tool and cheap machine for cutting threads on pipes, rods, or the like, for boring holes in wood or other materials, for forming tenons on spokes, for boring fellies, for sharpening disks, &c.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 4:
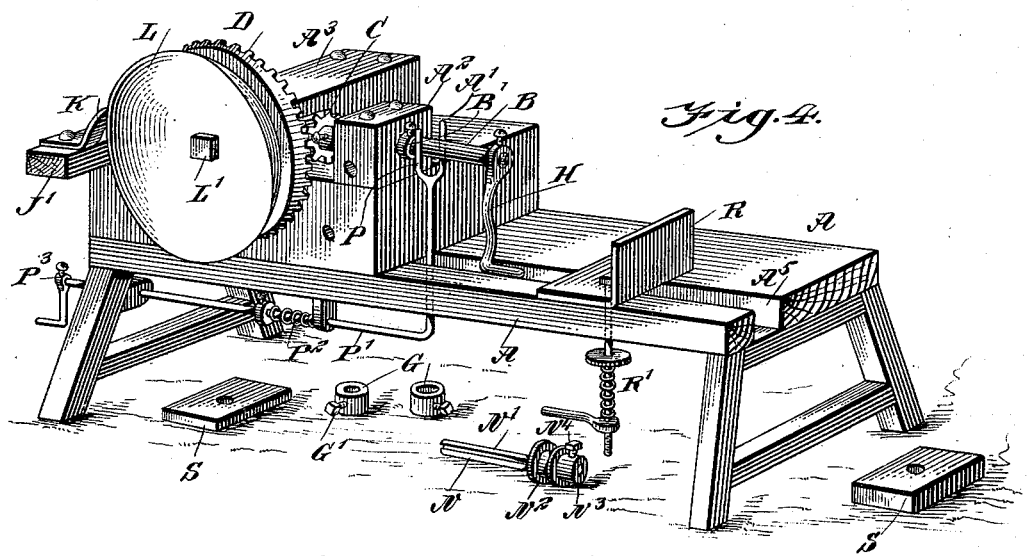
Figure 5:
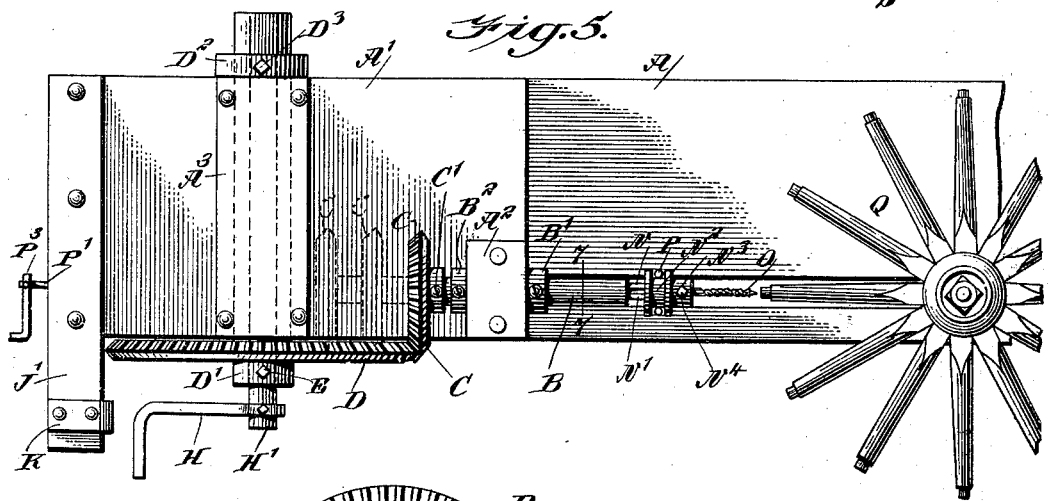
Figure 6:
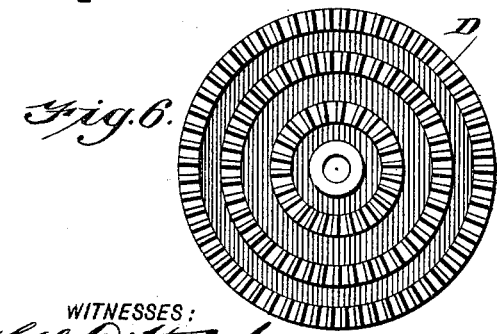
Figure 7:
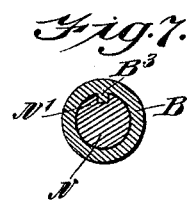

Figure 1 is a perspective view of the improvement arranged as a thread-cutter. Fig. 2 is a like view of the same with the pipe to be threaded in position. Fig. 3 is a similar view of the same with the cutter in position. Fig. 4 is a like view of the improvement arranged as a disk-sharpener. Fig. 5 is a plan view of the improvement arranged as a boring-machine. Fig. 6 is an enlarged rear face view of the multiple gear-wheel, and Fig. 7 is an enlarged cross-section of part of the improvement on the line 7 7 in Fig. 5.

A suitably-constructed bed A carries a head-stock A', having a bearing $A^2$ for a longitudinally-extending hollow shaft B, carrying on its inner end an adjustable bevel-pinion C, adapted to mesh with one of a number of bevel gear-wheels arranged concentrically on the inner face of a multiple gear-wheel D, having its hub D' extending transversely and journaled in suitable bearings $A^3$, held on the head-stock A'. The hollow shaft B is provided on opposite sides of its bearing $A^2$ with collars B' $B^2$ to prevent longitudinal movement of the hollow shaft B, but to allow of adjusting the same longitudinally by loosening the set-screws on the collars B' $B^2$. By the arrangement described the hollow shaft B may be adjusted to bring the pinion C in mesh with any one of the bevel gear-wheels on the multiple gear-wheel D, the latter being for the purpose shifted outwardly to allow movement of the pinion C, as described, until the pinion is in the proper position, and then the gear-wheel D is pushed back to its previous position by meshing with the pinion C. The hub D' of the multiple gear-wheel D is for the purpose provided at its rear end with a collar $D^2$, secured by a set-screw $D^3$ to the hub, the said collar abutting against the rear end of the bearing $A^3$, as is plainly shown in Fig. 5. Now by loosening the set-screw $D^3$ the hub D' and with it the wheel D can be moved transversely for the purpose mentioned. A set-screw E screws on the outer end of the hub D' to secure a pipe F or other article to be threaded in position in the hub and cause the pipe or other article to rotate with the gear-wheel D when the same is rotated by the operator turning a crank-arm H, removably attached to the shaft B.

In case smaller pipes, rods, or the like are to be threaded then a collar G, having a set-screw G', is secured in the hub D' of the gear-wheel D by the set-screw E, and the pipe or other article is secured in the collar G by a set-screw G'. (See Fig. 2.) Thus when the gear-wheel D is rotated the pipe or other article F rotates with the gear-wheel.

The cutter I for cutting the thread on the end of a pipe, rod, or the like, rotating with the gear-wheel D, is of any approved construction and is provided on its stock with handles I' for starting the cutter on the pipe or rod F by the operator turning the cutter in the usual manner. On the stock of the cutter I are also arranged sockets $I^2$, adapted to be engaged by handles $I^3$, extending in opposite directions, and adapted to rest on bars or arms J J', of which the bar J is removably secured to the head-stock A' by engaging one of a series of apertures $A^4$ in said head-stock, as is plainly indicated in Fig. 3. The other bar J' is secured on the head-stock A' and carries a sharpening-tool K for sharpening harrow-disks L or the like, (see Fig. 4,) said harrow-disk being mounted on the polygonal end of a rod L', secured in the hub D' of the gear-wheel D, so that when the latter is rotated the disk rotates with it, and its outer edge is sharpened by the cutter K.

In order to thread a pipe or rod or like article, the latter is secured in position to rotate with the wheel D, as previously described, and then the operator starts the cutter I on the article and inserts the handles I³, so that the latter abut or rest against the arms J J'. (See Fig. 3.) The operator now turns the crank-arm H so that the article is rotated, and a thread is cut on the pipe or rod by the stationary cutter engaging the article. When this has been done, the operator removes the arm J and handles I³ and then turns the cutter I in a reverse direction by the handle I', so as to unscrew the cutter from the article, and then the latter is removed from the wheel by unscrewing the set-screw G or E.

When it is desired to use the machine for boring holes in wood, metal, or other material or for forming tenons on spokes or for analogous purposes, then the crank-arm H is removed from the shaft B and is placed on a rod or pipe H', secured in the hub D' of the gear-wheel D by the set-screw E, as indicated in Fig. 5. When the operator turns the crank-arm H, the multiple gear-wheel D rotates the pinion C and the shaft B, according to the desired speed to be given to the shaft B, the pinion C being adjusted to engage a corresponding gear-wheel on the multiple gear-wheel D. (See Fig. 5.)

The hollow shaft B is provided with a key B³, engaging a keyway N' in a tool-holder N, mounted to slide in the shaft B and turning with the same by the action of the key B³. The tool-holder N is formed near its outer end with a shifting collar N² and a socket N³, having a set-screw N⁴ for fastening the boring or drilling tool O in position in the socket N³. The shifting collar N² is engaged by a fork P, extending downwardly through a longitudinal slot A⁵ in the bed A to connect at its lower end with a longitudinal rod P', mounted to slide in suitable bearings attached to the under side of the bed A. A spring P² presses the rod P' so as to normally hold the tool-holder N in an innermost position, said rod P being provided at its outer end with a suitable arm P³, adapted to be engaged by the operator to move the rod P' longitudinally against the tension of the spring and slide the tool-holder N outward, and thereby feed the drill O into the wood or other material to be bored. When the hole has been drilled, the operator releases the arm P³, whereby the spring P² immediately draws the tool-holder N and the drilling-tool O out of the bored hole, and then the work can be shifted and the above-described operation repeated for boring a second hole. The work Q is held on a support R, adjustably held on a bed A and adapted to be secured thereto by a suitable clamping device R', extending through the longitudinal slot A⁵ of the bed A, the clamping device being arranged to engage the under side of the bed and lock the support R in position on the bed. Blocks S may be used on the support R for raising the work Q to the desired position—that is, to bring the work in alinement with the tool O.

From the foregoing it is evident that a very simple and cheap machine is produced which can be readily used for cutting external threads on pipes, rods, and the like, for boring holes in wood, metal, or other material, for sharpening disks, for boring wheel-hubs, for forming tenons on spokes, and for various other purposes.

Having thus fully described my invention, I claim as new and desire to secure by Letters Patent—

1. A machine of the class described, comprising a gear-wheel, a pinion in mesh therewith, means for driving either the gear-wheel or the said pinion, and means for securing work to the gear-wheel and means also for securing a boring-tool to the pinion, as set forth.

2. A machine of the class described, comprising a gear-wheel, a pinion in mesh therewith, said gear-wheel having a fastening device at its hub to secure the article to be threaded in position in the hub of the gear-wheel, and means for holding a thread-cutting die-stock in a fixed position on the article while the latter is rotated, as set forth.

3. A machine of the class described, comprising a driven pinion, a gear-wheel in mesh therewith and having a set-screw in its hub, a collar having a set-screw fitting into said gear-wheel hub and adapted to be secured therein by the hub set-screw, the collar being adapted to receive and hold the work to be threaded, and pins for engaging the arms of a thread-cutting die-stock and holding the cutter in place on the work while the latter is rotated, as set forth.

4. A machine of the class described, comprising a multiple gear-wheel adapted to be rotated, means for securing a piece of work to said gear-wheel, a pinion in mesh with one of the gear-wheels of said multiple gear-wheel, a hollow shaft carrying said pinion, a tool-holder mounted to turn with and to slide in said hollow shaft, a shifting device for said tool-holder, and means on the tool-holder for carrying the boring or drilling tool, as set forth.

5. A machine of the class described, comprising a multiple gear-wheel, a driven pinion in mesh with one of the said multiple gear-wheels, a set-screw in the hub of the multiple gear-wheel, and a rod for carrying a disk and adapted to be secured in said multiple-gear-wheel hub by said set-screw, and a fixed cutter for engaging said disk and sharpening the same, as set forth.

In testimony whereof I have signed my name to this specification in the presence of two subscribing witnesses.

GEORGE WILLIAM HOADLEY.

Witnesses:
SPENCER H. AMOS,
J. R. WHITE.